(12) United States Patent
Tsai et al.

(10) Patent No.: US 11,487,155 B2
(45) Date of Patent: Nov. 1, 2022

(54) BACKLIGHT MODULE AND DISPLAY DEVICE

(71) Applicant: Radiant Opto-Electronics Corporation, Kaohsiung (TW)

(72) Inventors: Yi-Lin Tsai, Kaohsiung (TW); Shin-Min Huang, Kaohsiung (TW); Chen-Ming Li, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/752,839

(22) Filed: May 24, 2022

(65) Prior Publication Data

US 2022/0291549 A1 Sep. 15, 2022

Related U.S. Application Data

(63) Continuation of application No. 17/351,265, filed on Jun. 18, 2021, now Pat. No. 11,372,283.

(30) Foreign Application Priority Data

Mar. 11, 2021 (TW) .................................. 110108674

(51) Int. Cl.
*G02F 1/1335* (2006.01)
*G02F 1/13357* (2006.01)
(52) U.S. Cl.
CPC .. *G02F 1/133607* (2021.01); *G02F 1/133603* (2013.01)

(58) Field of Classification Search
CPC ..................... G02F 1/133607; G02F 1/133603
See application file for complete search history.

(56) References Cited

U.S. PATENT DOCUMENTS

| | | |
|---|---|---|
| 2001/0013911 A1 | 8/2001 | Kim |
| 2006/0290253 A1 | 12/2006 | Yeo |
| 2009/0051852 A1 | 2/2009 | Chen |
| 2010/0053939 A1 | 3/2010 | Fan |
| 2012/0019743 A1* | 1/2012 | Chen .................... G02B 6/0065 362/609 |
| 2018/0039009 A1 | 2/2018 | Chong |
| 2019/0049790 A1 | 2/2019 | Okabe |
| 2019/0162893 A1* | 5/2019 | Asatani ................ G02B 6/0073 |
| 2021/0149252 A1* | 5/2021 | Nonaka ..................... F21S 2/00 |

FOREIGN PATENT DOCUMENTS

| | | |
|---|---|---|
| CN | 2662287 Y | 12/2004 |
| CN | 103292246 A | 9/2013 |
| CN | 105044984 A | 11/2015 |

(Continued)

*Primary Examiner* — Evan P Dzierzynski
(74) *Attorney, Agent, or Firm* — Winston Hsu

(57) ABSTRACT

A backlight module includes an optical plate, a light source, and at least one optical film. The optical plate includes a light-emitting surface, a bottom surface and a side surface. The light source faces to the bottom surface or the side surface. The optical film is disposed above the light-emitting surface and includes a main body and at least one refractive part disposed on an end surface of the main body. The refractive part includes a plurality of microstructures and a substrate. The substrate is adhered to the end surface, and the microstructures are distributed in the substrate.

20 Claims, 5 Drawing Sheets

(56) References Cited

FOREIGN PATENT DOCUMENTS

| | | |
|---|---|---|
| CN | 206270522 U | 6/2017 |
| CN | 207164290 U | 3/2018 |
| CN | 109061935 A | 12/2018 |
| CN | 111812875 A | 10/2020 |
| CN | 212060820 U | 12/2020 |
| JP | 2002-22965 A | 1/2002 |
| TW | M295745 U | 8/2006 |
| TW | 201426125 A | 7/2014 |

* cited by examiner

BACKLIGHT MODULE AND DISPLAY DEVICE

CROSS REFERENCE TO RELATED APPLICATIONS

This application is a continuation application of U.S. application Ser. No. 17/351,265, filed on Jun. 18, 2021, which claims priority to Taiwan Application Serial Number 110108674, filed on Mar. 11, 2021. The entire contents of each of which are incorporated herein by reference.

BACKGROUND OF THE INVENTION

1. Field of the Invention

The present disclosure relates to a backlight module and a display device, and more particularly, to a backlight module capable of avoiding forming bright lines in an edge area thereof and a display device having the same.

2. Description of the Prior Art

With the advancement of science and technology, electronics with liquid crystal display devices, such as cell phones, tablets, laptops, etc., have become indispensable items in modern life. Since the liquid crystal itself does not emit light, the liquid crystal display device requires a backlight module to provide light source.

Please refer to FIG. 1, which is a cross-sectional view showing a conventional backlight module 1. The light source 3 cannot be seen in this view angle. Herein, the light source 3 is drawn in dotted line for showing the relative positions of the light source 3 and the optical plate 2. The backlight module 1 includes an optical plate 2, a light source 3, at least one optical film 5 and an outer frame 6. Herein, the light source 3 is a LED light bar which includes a plurality of LEDs 4. Most of the light rays emitted from the LEDs 4 are guided by the optical plate 2 to uniformly emit from a light-emitting surface S1 of the optical plate 2. However, a few light rays, such as the light ray L0, emit from a side surface S2 of the optical plate 2 and are reflected by the outer frame 6 to pass through the optical film 5 from an end surface S3 of the optical film 5 to a surface S4 of the optical film 5. As a result, a bright line is formed in an edge area E of the optical film 5, and the image quality of the liquid crystal display device is affected thereby.

SUMMARY OF THE INVENTION

According to an embodiment of the present disclosure, a backlight module includes an optical plate, a light source and at least one optical film. The optical plate includes a light-emitting surface, a bottom surface and a side surface. The bottom surface is opposite to the light-emitting surface. The side surface is connected between the light-emitting surface and the bottom surface. The light source faces to the bottom surface or the side surface of the optical plate. The optical film is disposed above the light-emitting surface and includes a main body and at least one refractive part. The main body includes a first surface, a second surface and at least one end surface. The second surface is opposite to the first surface. The end surface is connected between the first surface and the second surface. The refractive part is disposed on the end surface. The refractive part includes a plurality of microstructures and a substrate. The substrate is adhered to the end surface, and the microstructures are distributed in the substrate.

According to another embodiment of the present disclosure, a backlight module includes a frame, an optical plate, a light source and at least one optical film. The frame includes a back plate and a lateral wall. The lateral wall surrounds the back plate. The optical plate includes a light-emitting surface, a bottom surface and a side surface. The bottom surface is opposite to the light-emitting surface. The side surface is connected between the light-emitting surface and the bottom surface. The light source faces to the bottom surface or the side surface of the optical plate. The optical film is disposed above the light-emitting surface and includes a main body and at least one refractive part. The main body includes a first surface, a second surface and at least one end surface. The second surface is opposite to the first surface. The end surface is connected between the first surface and the second surface. The refractive part is disposed on the end surface. An inner surface of the lateral wall includes a first area and a second area. The first area is corresponding to the optical film. The second area is corresponding to the optical plate. A surface roughness of the first area is greater than a surface roughness of the second area.

According to further another embodiment of the present disclosure, a backlight module includes a frame, an optical plate, a light source and at least one optical film. The frame includes a back plate and a lateral wall. The lateral wall surrounds the back plate. The optical plate includes a light-emitting surface, a bottom surface and a side surface. The bottom surface is opposite to the light-emitting surface. The side surface is connected between the light-emitting surface and the bottom surface. The light source faces to the bottom surface or the side surface of the optical plate. The optical film is disposed above the light-emitting surface and includes a main body and at least one refractive part. The main body includes a first surface, a second surface and at least one end surface. The second surface is opposite to the first surface. The end surface is connected between the first surface and the second surface. The refractive part is disposed on the end surface. An inner surface of the lateral wall includes a first area and a second area. The first area is corresponding to the optical film. The second area is corresponding to the optical plate. A reflectivity of the first area is smaller than a reflectivity of the second area.

According to yet another embodiment of the present disclosure, a display device includes the aforementioned backlight module and a display panel. The display panel is disposed above the backlight module.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part thereof, and in which is shown by way of illustration specific embodiments in which the disclosure may be practiced. In this regard, directional terminology, such as up, down, left, right, front, back, bottom, top, etc., is used with reference to the orientation of the Figure(s) being described. As such, the directional terminology is used for purposes of illustration and is in no way limiting. In addition, identical numeral references or similar numeral references are used for identical elements or similar elements in the following embodiments.

According to the present disclosure, when two elements are substantially parallel, it refers that an angle is between the two elements, and the angle is 0±10 degrees. Preferably, the angle is 0±5 degrees. More preferably, the angle is 0±3 degrees. Alternatively, the angle is 180±10 degrees. Preferably, the angle is 180±5 degrees. More preferably, the angle is 180±3 degrees.

According to the present disclosure, a backlight module can be used to provide light source for the liquid crystal display (LCD) panel. Each element of the backlight module includes a bottom surface and a top surface. The bottom surface and the top surface are defined based on the LCD panel. A surface of each element away from the LCD panel is defined as the bottom surface, and a surface of each element facing toward the LCD panel is defined as the top surface. Moreover, when an element is disposed above another element, it refers that the element is disposed on a top surface of the another element or disposed above the top surface of the another element.

Figure 1:
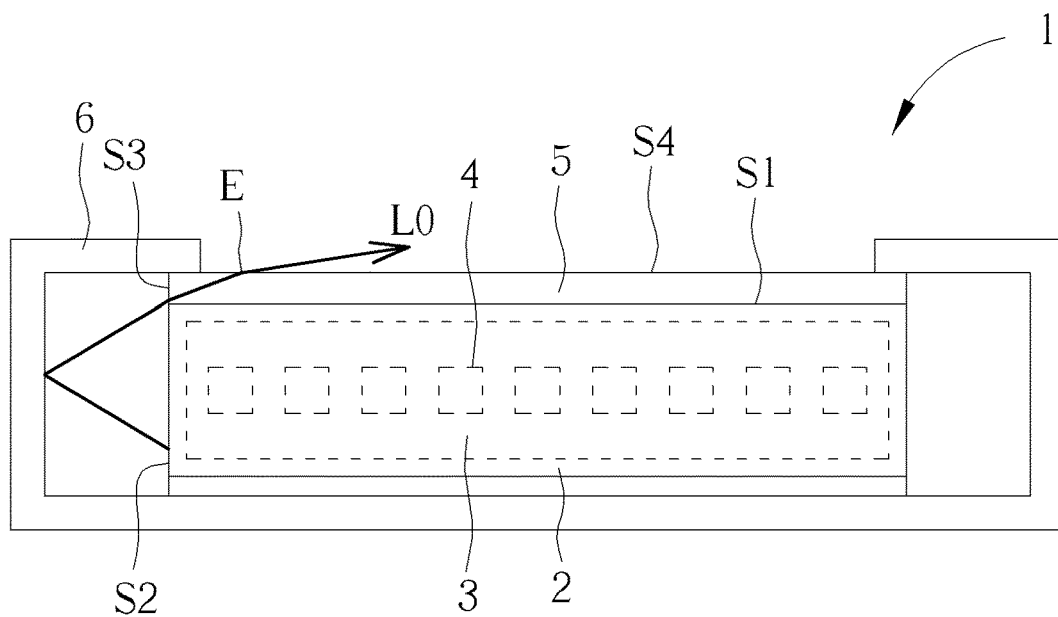
FIG. 1 is a cross-sectional view showing a conventional backlight module.
Figure 2:
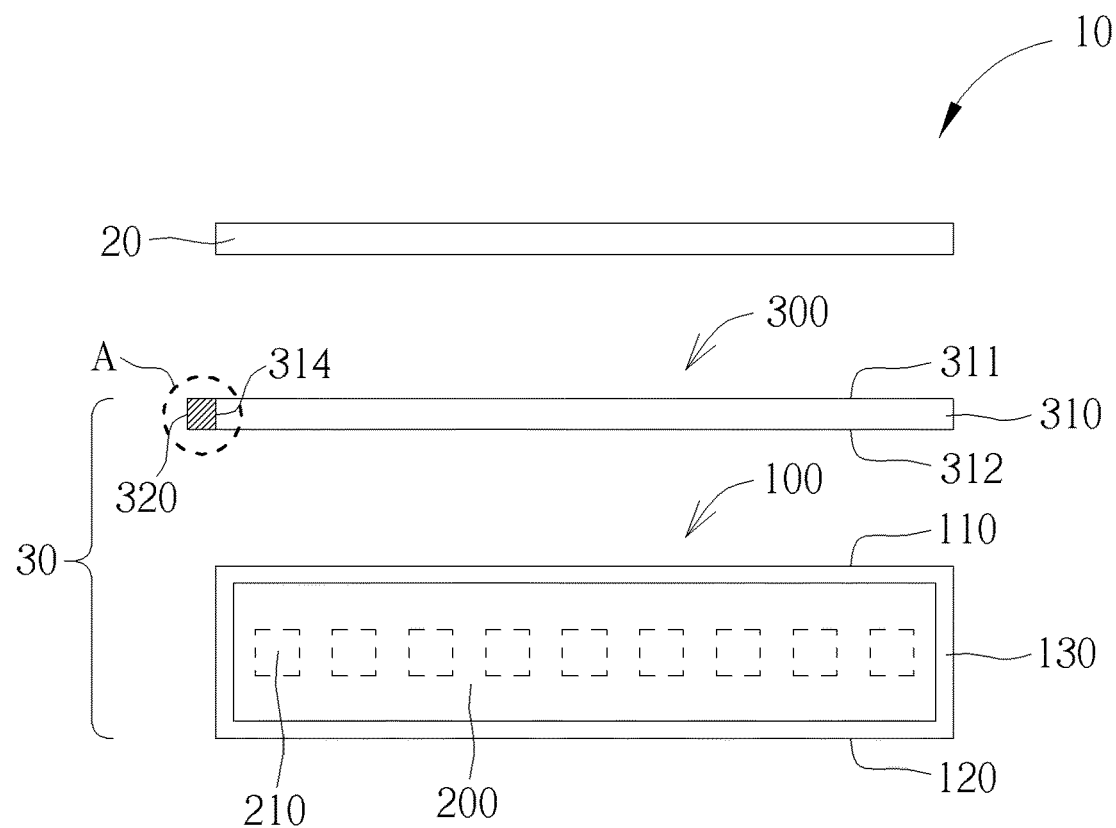
FIG. 2 is an exploded schematic diagram showing a side view of a display device according to one embodiment of the present disclosure.

Please refer to FIG. 2, which is an exploded schematic diagram showing a side view of a display device 10 according to one embodiment of the present disclosure. The display device 10 includes a backlight module 30 and a display panel 20. The display panel 20 is disposed above the backlight module 30. The backlight module 30 is used to provide light rays for the display panel 20. The display panel 20 can be a LCD panel.

The backlight module 30 includes an optical plate 100, alight source 200 and at least one optical film 300. The optical plate 100 includes a light-emitting surface 110, a bottom surface 120 and a side surface 130. The bottom surface 120 is opposite to the light-emitting surface 110. The side surface 130 is connected between the light-emitting surface 110 and the bottom surface 120.

The light source 200 can face to the bottom surface 120 or the side surface 130 of the optical plate 100. Specifically, the light source 200 can be disposed under the bottom surface 120 or adjacent to the side surface 130 of the optical plate 100. That is, the backlight module 30 can be a direct-type backlight module or a side-type backlight module. Herein, the light source 200 is exemplarily disposed adjacent to the side surface 130 of the optical plate 100, and thus the backlight module 30 is exemplarily a side-type backlight module. The light source 200 can be, but is not limited to, a cold cathode fluorescent lamp (CCFL) or a LED light bar. Herein, the light source 200 is exemplarily a LED light bar which includes a plurality of LEDs 210.

The optical film 300 is disposed above the light-emitting surface 110 of the optical plate 100. The optical film 300 includes a main body 310 and at least one refractive part 320. Please also refer to FIG. 6, which is a three-dimensional exploded diagram showing the backlight module 30 in FIG. 2. The main body 310 includes a first surface 311, a second surface 312, a first end surface 313, a second end surface 314, a third end surface 315 and a fourth end surface 316. The second surface 312 is opposite to the first surface 311. Each of the first end surface 313, the second end surface 314, the third end surface 315 and the fourth end surface 316 is connected between the first surface 311 and the second surface 312. The first end surface 313 is opposite to the third end surface 315. The second end surface 314 is opposite to the fourth end surface 316 and is connected between the first end surface 313 and the third end surface 315. The first end surface 313 faces toward the light source 200. Herein, the number of the refractive part 320 is one and the refractive part 320 is disposed on the second end surface 314, which is exemplary and the present disclosure is not limited thereto.

Figure 3:
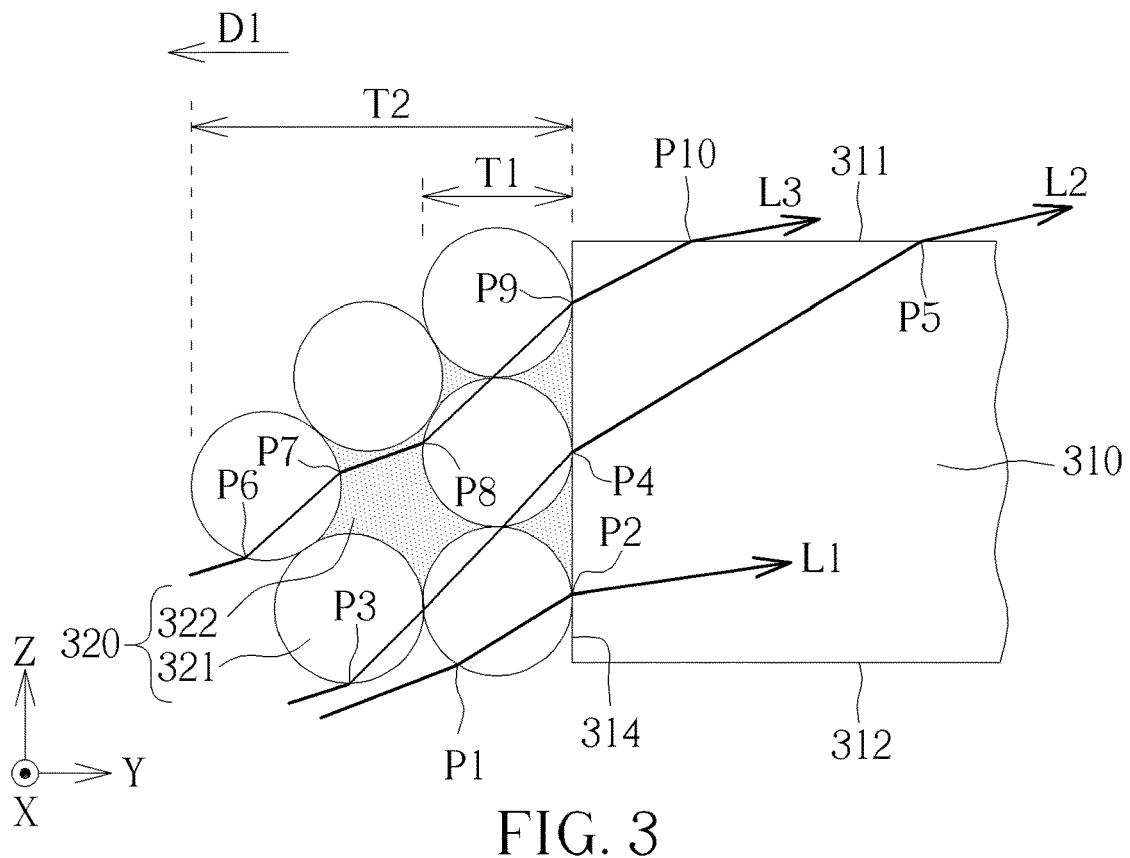
FIG. 3 is an enlarged view of a portion A in FIG. 2.

Please refer to FIG. 3, which is an enlarged view of a portion A in FIG. 2. To clearly illustrate, the directions in FIG. 3 are based on an XYZ rectangular coordinate system, wherein the X direction is perpendicular to and pointing out of the plane of the paper. In the main body 310 of the optical film 300, the first surface 311 is parallel to the XY-plane, and the second end surface 314 is parallel to the XZ-plane. In the embodiment, the refractive part 320 includes a plurality of microstructures 321. The microstructures 321 are stacked from the second end surface 314 as a datum level and are stacked along a side direction D1 away from the second end surface 314, wherein the side direction D1 is parallel to the Y direction. The refractive part 320 has non-uniform thickness (i.e., the left end points of the refractive part 320 have different Y coordinates) relative to the second end surface 314 along the side direction D1. For example, the thickness T1 is different from the thickness T2. Further, a refractive index of the refractive part 320 is different from a refractive index of the main body 310, such that a plurality of light rays, such as light rays L1, L2 and L3, are deflected toward different directions after passing through the refractive part 320. For example, the structure that the refractive part 320 has non-uniform thickness relative to the second end surface 314 along the side direction D1 can be achieved by stacking the microstructures 321 with substantially identical size or different sizes.

In FIG. 3, the microstructures 321 have substantially identical size. With the stacking method of the microstructures 321, the microstructures 321 are located at different heights to allow the refractive part 320 to have non-uniform thickness relative to the second end surface 314 along the side direction D1, such as the unequal thicknesses T1 and T2. Herein, a direction of the height is parallel to the Y direction. As such, the plurality of light rays have different light paths in the refractive part 320 due to non-uniform thickness, which is favorable for the plurality of light rays to emit out the refractive part 320 at different positions. Taking the light rays L1 and L2 as an example, the light path of the light ray L1 in the refractive part 320 is the straight-line distance from the point P1 to the point P2, and the light path of the light ray L2 in the refractive part 320 is the straight-line distance from the point P3 to the point P4. The light path of the light ray L2 in the refractive part 320 is longer than that of the light ray L1 in the refractive part 320. Moreover, compared with the optical film without the refractive part 320 (not shown), the number of deflections of the light rays can be increased when the light rays pass through both the refractive part 320 and the main body 310, which can owe to the refractive indices of the refractive part 320 and the main body 310 being different. Taking the light ray L2 as an example, the first deflection occurs when the light ray L2 travels from the air to the refractive part 320 at the point P3, the second deflection occurs when the light ray L2 travels from the refractive part 320 to the main body 310 at the point P4, and the third deflection occurs when the light ray L2 travels from the main body 310 to the air at the point P5. As a comparison, when the optical film is not disposed with the refractive part 320, the first deflection occurs when the light ray L2 travels from the air to the main body 310, and the second deflection occurs when the light ray L2 travels from the main body 310 to the air. Therefore, with the refractive part 320 and the main body 310 having different refractive indices, the number of deflections of the light rays can be increased, which can disperse a light ray into a plurality of light rays that emit out at different positions of the main body 310. Accordingly, the bright line generated by the light rays emitting out at the same position can be avoided, and the effect of softening the light rays can be achieved. As such, the image quality of the display device 10 can be enhanced, and it is beneficial to configure the display device 10 as a narrow border display device.

Figure 4:
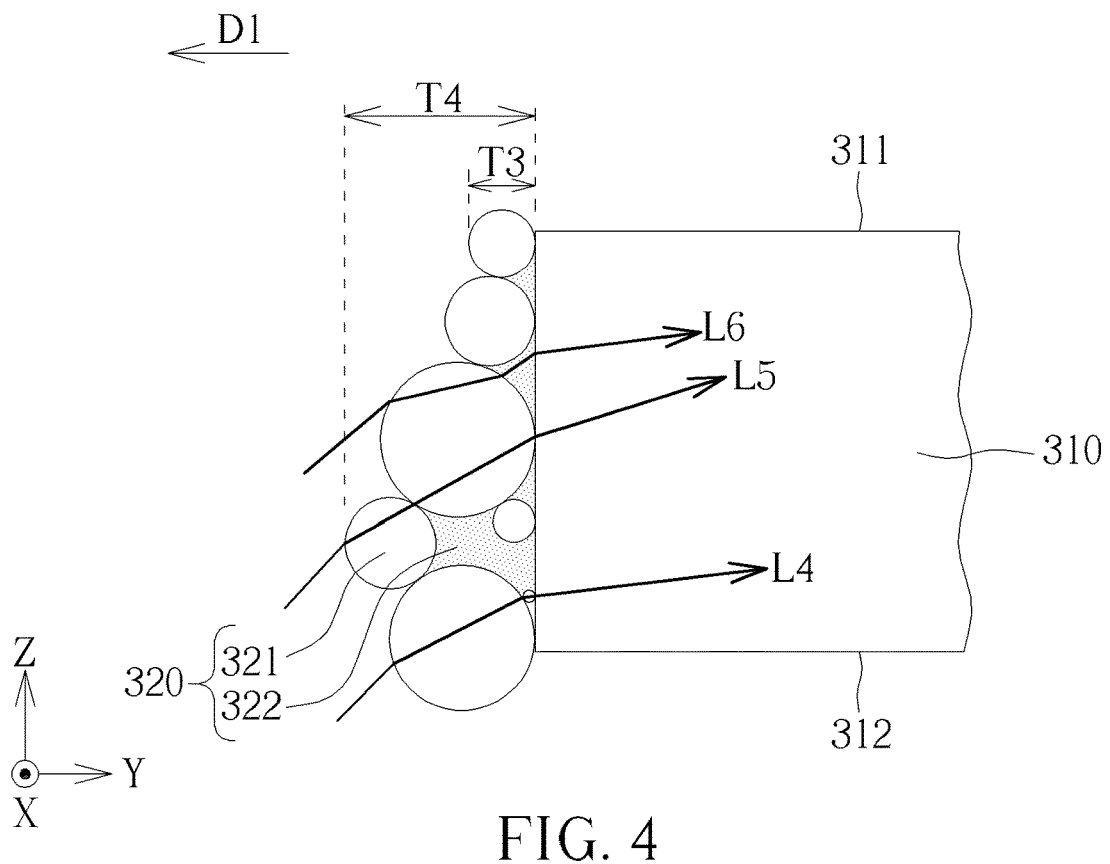
FIG. 4 is an enlarged view of the portion A in FIG. 2 according to another embodiment of the present disclosure.

Please refer to FIG. 4, which is an enlarged view of the portion A in FIG. 2 according to another embodiment of the present disclosure. Similar to FIG. 3, the directions in FIG. 4 are based on the XYZ rectangular coordinate system. Compared to FIG. 3, the plurality of microstructures 321 have different sizes in the embodiment. For example, the plurality of microstructures 321 have at least two sizes. Taking the microstructures 321 being ball-shaped and having different sizes as an example, the curvature of the spherical surface allows the plurality of light rays, such as the light rays L4, L5 and L6, to be deflected toward different directions after passing through the refractive part 320.

As shown in FIG. 4, the microstructures 321 have different sizes, and the microstructures 321 are stacked from the second end surface 314 (i.e., XZ-plane) as a datum level along the side direction D1 away from the second end surface 314 to allow the refractive part 320 to have non-uniform thickness relative to the second end surface 314 along the side direction D1, such as the unequal thicknesses T3 and T4. As such, the plurality of light rays have different light paths in the refractive part 320. For example, the light path of the light ray L5 in the refractive part 320 is longer than the light path of the light ray L4 in the refractive part 320. Accordingly, it is favorable for the plurality of light rays to emit out the refractive part 320 at different positions. Moreover, with the refractive part 320 and the main body 310 having different refractive indices, when the light rays pass through both the refractive part 320 and main body 310, the number of deflections of the light rays can be increased. For details of FIG. 4, references can be made to the related description of FIG. 3. Moreover, the microstructures 321 with different sizes can also have different refractive indices, which can enhance the random degree of the deflections of the light rays. Accordingly, the bright line generated by the light rays emitting out at the same position can be avoided, and the effect of softening the light rays can be achieved. In FIG. 4, the thickness of the refractive part 320 along the side direction D1 can also be adjusted by changing the stacking method of the microstructures 321. In the embodiment, the refractive index of the main body 310 can be 1 to 3, and the refractive index of the refractive part 320 can be 1 to 3. In summary, with the microstructures 321 having different sizes or having identical size but being stacked by different methods, the refractive part 320 is allowed to have non-uniform thickness on the XZ-plane, so as to increase the number of deflections of the light rays. Accordingly, the bright line generated by the light rays emitting out at the same position can be avoided, and the effect of softening the light rays can be achieved.

As shown in FIGS. 3 and 4, the refractive part 320 can further include a substrate 322, the microstructures 321 are distributed in the substrate 322. The substrate 322 can be an adhesive to adhere the microstructures 321 on the second end surface 314. However, it is only exemplary, and the present disclosure is not limited thereto. In other embodiment, the substrate 322 can be omitted, and the microstructures 321 can be attached on the second end surface 314 directly. Moreover, a refractive index of the substrate 322 can be the same as or different from that of the microstructures 321. When the refractive indices of the substrate 322 and the microstructures 321 are different, it is favorable for increasing the number of the deflections of the light rays. As such, the effect of dispersing the light rays can be enhanced. Taking the light ray L3 shown in FIG. 3 as an example, the first deflection occurs when the light ray L3 travels from the air to the microstructures 321 at the point P6, the second deflection occurs when the light ray L3 travels from the microstructures 321 to the substrate 322 at the point P7, the third deflection occurs when the light ray L3 travels from the substrate 322 to the microstructures 321 at the point P8, the fourth deflection occurs when the light ray L3 travels from the microstructures 321 to the main body 310 at the point P9, and the fifth deflection occurs when the light ray L3 travels from the main body 310 to the air at the point P10. Similarly, as shown in FIG. 4, the light ray L6 passes through the substrate 322, but the light rays L4 and L5 do not pass through the substrate 322. As a result, the number of the deflections of the light rays L6 is more than that of the light rays L4 and L5.

The microstructures 321 have light transmitting property. The microstructures 321 can be made of $TiO_2$, $SiO_2$, $Ta_2O_5$, poly(methyl methacrylate) (PMMA) or a combination thereof. The microstructures 321 can be microparticles, nanoparticles or a combination thereof. For example, the size of the microstructures 321 can be, but is not limited to, 0.1 μm to 20 μm. The shape of the microstructures 321 is exemplarily ball-shaped. The normal direction of each of the points on the spherical surface varies along the spherical surface, which is favorable for changing the travel directions of the plurality of light rays. Taking the light rays L1 and L2 shown in FIG. 3 as an example, the travel directions of the light rays L1 and L2 are substantially parallel to each other before entering into the refractive part 320. Because the positions where the light rays L1 and L2 entering into the microstructures 321 are different (i.e., the position of the point P1 on the spherical surface is different from the position of the point P3 on the spherical surface), the incident angles of the light ray L1 and L2 into the microstructures 321 are different, which affects the subsequent deflection angles thereof. In other embodiment, the microstructures 321 can be polyhedral structures, such as cubes, cuboids, etc. Different normal directions can be provided by different planes. As such, different incident angles can be formed when a plurality of light rays parallel to each other project on the different planes. It is also beneficial to change the travel directions of the plurality of light rays. Herein, the microstructures 321 are solid particles. However, the present disclosure is not limited thereto. For example, in other embodiments, the microstructures 321 can be hollow particles, composite particles or a combination thereof. Each of the hollow particles (not shown) can include a hollow portion (the refractive index of air equals to 1) and a shell portion (the refractive index thereof is greater than 1). The shell portion can be made of TiO2, SiO2, Ta2O5, resin (such as PMMA) or a combination thereof. Each of the composite particles (not shown) can be, but is not limited to, a core-shell structure. The core-shell structure can include a core portion and a shell portion. The core portion can be made of TiO2, SiO2 or Ta2O5, and the shell portion can be made of resin, such as PMMA. Alternatively, the core portion and the shell portion can be made of different resins. As such, each of the microstructures 321 can provide two different refractive indices, the effect of dispersing the light rays can be enhanced thereby.

Figure 7:
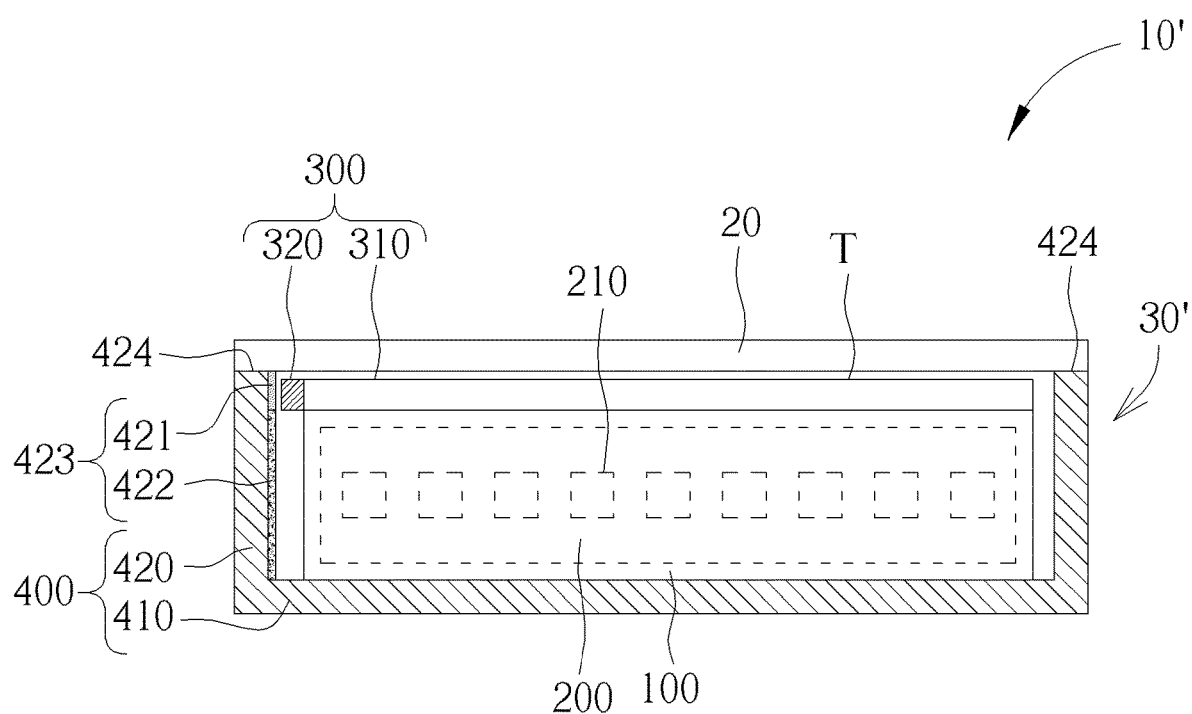
FIG. 7 is a cross-sectional view showing a display device according to another embodiment of the present disclosure.

Please refer to FIG. 7, which is a cross-sectional view showing a display device 10' according to another embodiment of the present disclosure. The light source 200 cannot be seen in this view angle. Herein, the light source 200 is drawn in dotted line for showing the relative positions of the light source 200 and the optical plate 100. Compared with the display device 10 in FIG. 2, the backlight module 30' further includes a frame 400. The frame 400 includes a back plate 410 and a lateral wall 420. The lateral wall 420 surrounds the back plate 410. The optical plate 100, the light source 200 and the optical film 300 are carried by the back plate 410. A top 424 of the lateral wall 420 is configured to carry the display panel 20, and a top surface T of the optical film 300 is not shielded by the lateral wall 420. In other words, the display device 10' is a display device without plastic frame. The number of deflections of the light rays reflected by the frame 400 can be increased via passing through the refractive part 320. As such, the bright line generated by the light rays concentrated at the same position can be avoided. Accordingly, it is not required to use the lateral wall 420 to shield the top surface T of the optical film 300 to cover the bright line, and the display device 10' can be configured as a display device without plastic frame.

In FIG. 7, an inner surface 423 of the lateral wall 420 includes a first area 421 and a second area 422. For clearly distinguishing the first area 421 and the second area 422, the first area 421 and the second area 422 are sprinkled with different dots. The first area 421 is corresponding to the optical film 300, and the second area 422 is corresponding to the optical plate 100. A surface roughness of the first area 421 can be greater than a surface roughness of the second area 422, and/or a reflectivity of the first area 421 can be smaller than a reflectivity of the second area 422. Specifically, when the first area 421 is arranged with a smaller reflectivity, it can ensure that less light rays are reflected by the first area 421 to the optical film 300; when the first area 421 is arranged with a greater roughness, it can provide the light rays reflected by the first area 421 a higher random degree of reflection directions. As such, it can ensure that the inner surface 423 of the lateral wall 420 is able to reflect the light rays back to the optical plate 100 for reuse, while avoiding the light rays from being concentrated at the same position of the optical film 300, which can further soften the light rays.

Figure 6:
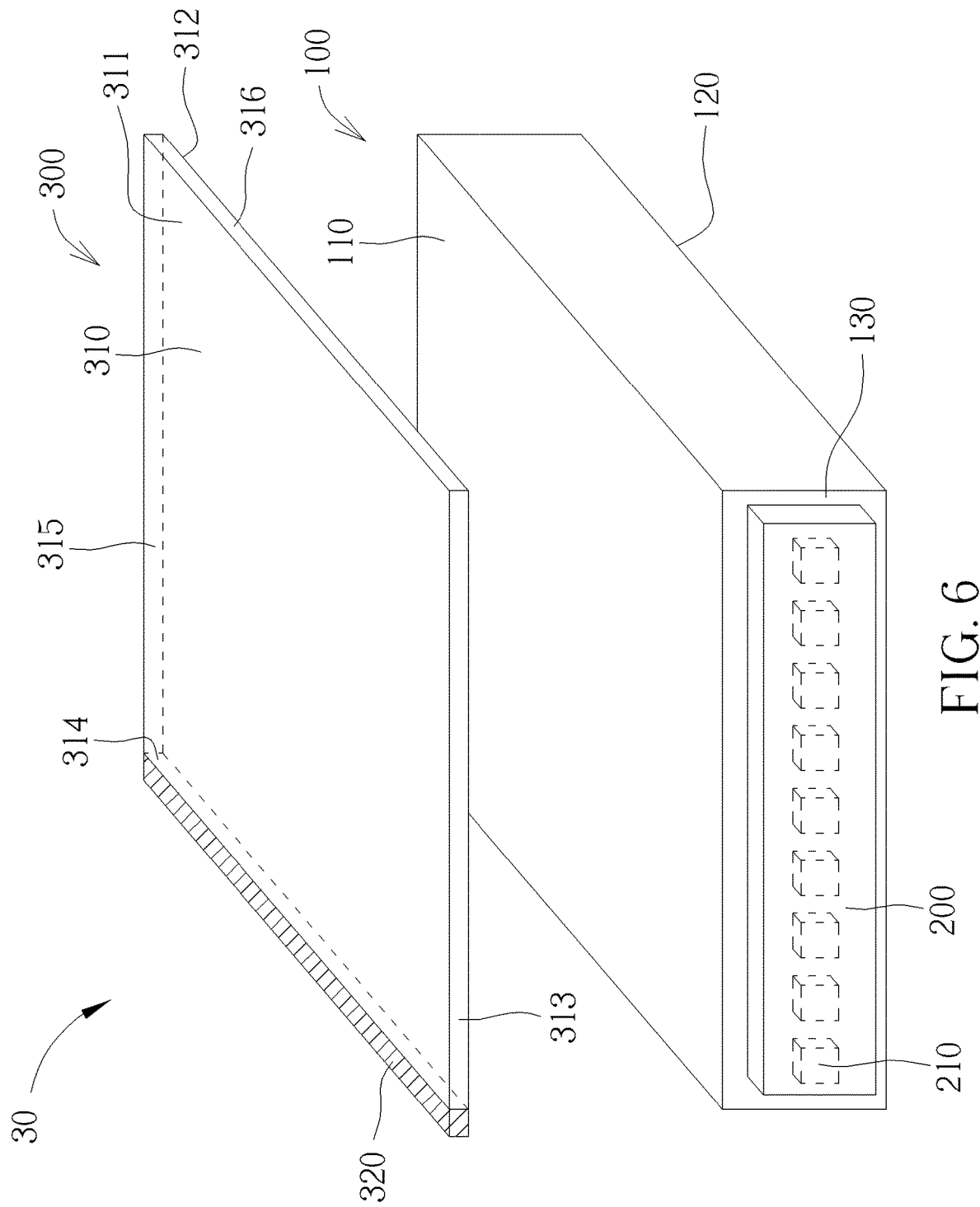
FIG. 6 is a three-dimensional exploded diagram showing a backlight module in FIG. 2.

Please refer FIGS. 2 and 6. In the embodiment, the optical film 300 only has a refractive part 320 disposed on the second end surface 314. However, the present disclosure is not limited thereto. In other embodiment, when the light source is also disposed on the side surface of the optical plate and corresponds to the first end surface of the optical film, the backlight module can preferably include two refractive parts disposed on the second end surface and the fourth end surface, respectively. Alternatively, the backlight module can only include one refractive part disposed on the first end surface or the third end surface. Alternatively, the backlight module can include three refractive parts disposed on the second end surface, the third end surface and the fourth end surface, respectively. In other words, the number and/or the position of the refractive part can be adjusted according to practical demands, such as the arrangement of the optical elements in the backlight module or the desired optical properties of the backlight module. Moreover, in the embodiment, the backlight module 30 includes an optical film 300, which is only exemplary. In other embodiment, the backlight module 30 can include a plurality of optical films, and at least one of the optical films is disposed with the refractive part.

Figure 5:
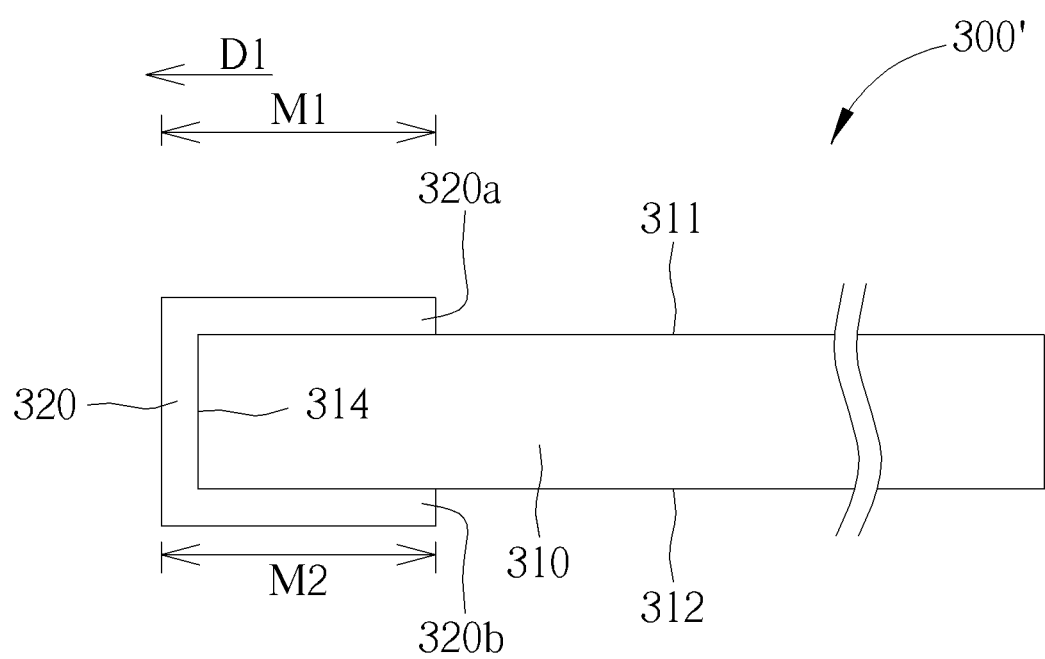
FIG. 5 is a schematic diagram showing an optical film according to another embodiment of the present disclosure.

Please refer to FIG. 5, which is a schematic diagram showing an optical film 300' according to another embodiment of the present disclosure. Compared to the optical film 300, the refractive part 320 of the optical film 300' has a first extending portion 320a and a second extending portion 320b. The first extending portion 320a extends from the second end surface 314 to the first surface 311 of the main body 310, and the second extending portion 320b extending from the second end surface 314 to the second surface 312 of the main body 310. With the arrangement, the light rays (not shown) reflected by the frame can further pass through the first extending portion 320a and/or the second extending portion 320b after passing through and deflected by the refractive part 320 on the second end surface 314. It is favorable for increasing the number of deflections of the light rays and enhancing the effect of dispersing the light rays. According to one embodiment, when a length of the first extending portion 320a parallel to the side direction D1 is M1, the following relationship can be satisfied: $0<M1\leq 2$ mm; when a length of the second extending portion 320b parallel to the side direction D1 is M2, the following relationship can be satisfied: $0<M2\leq 2$ mm. M1 and M2 can be the same or different. According to another embodiment, the refractive part 320 can be arranged with one of the first extending portion 320a and the second extending portion 320b to solve the problem of the bright line resulted from the light rays reflected by other components, such as a upper plastic frame the or a lower optical plate.

Compared to the prior art, the backlight module of the present disclosure includes an optical film disposed with at least one refractive part on at least one end surface thereof, which allows a plurality of light rays deflected toward different directions after passing through the refractive part. The bright line generated by the light rays concentrated at the same position can be avoided, and the effect of softening the light rays can be achieved. Accordingly, the image quality of the display device can be enhanced, and it is beneficial to the application of the display device without plastic frame or the narrow border display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A backlight module, comprising:
   an optical plate, comprising:
   a light-emitting surface;
   a bottom surface opposite to the light-emitting surface; and a side surface connected between the light-emitting surface and the bottom surface;
a light source facing to the bottom surface or the side surface of the optical plate; and
at least one optical film disposed above the light-emitting surface, the optical film comprising:
a main body, comprising:
a first surface;
a second surface opposite to the first surface; and
at least one end surface connected between the first surface and the second surface; and
at least one refractive part disposed on the end surface, wherein the refractive part comprises a plurality of microstructures and a substrate, the substrate is adhered to the end surface, and the microstructures are distributed in the substrate.

2. The backlight module of claim 1, wherein the microstructures are stacked from the end surface along a side direction away from the end surface and have substantially identical sizes located at different heights to allow the refractive part to have non-uniform thickness relative to the end surface along the side direction.

3. The backlight module of claim 1, wherein the microstructures are stacked from the end surface along a side direction away from the end surface and have different sizes to allow the refractive part to have non-uniform thickness relative to the end surface along the side direction.

4. The backlight module of claim 1, wherein the refractive part has a first extending portion extending from the end surface to the first surface of the main body.

5. The backlight module of claim 4, wherein the refractive part further has a second extending portion extending from the end surface to the second surface of the main body.

6. The backlight module of claim 1, wherein a refractive index of the substrate is different from that of the microstructures.

7. The backlight module of claim 1, wherein the microstructures are microparticles, nanoparticles or a combination thereof.

8. The backlight module of claim 1, wherein the microstructures are hollow particles, composite particles or a combination thereof.

9. The backlight module of claim 1, wherein the light source is adjacent to the side surface of the optical plate, a number of the end surfaces is four, the end surfaces are a first end surface, a second end surface, a third end surface and a fourth end surface, the first end surface is opposite to the third end surface, the second end surface is opposite to the fourth end surface and is connected between the first end surface and the third end surface, and the first end surface faces toward the light source.

10. The backlight module of claim 9, wherein a number of the refractive parts is two, and the refractive parts are respectively disposed on the second end surface and the fourth end surface.

11. The backlight module of claim 9, wherein the refractive part is disposed on the first end surface or the third end surface.

12. The backlight module of claim 9, wherein a number of the refractive parts is three, and the refractive parts are respectively disposed on the second end surface, the third end surface and the fourth end surface.

13. The backlight module of claim 1, further comprising:
a frame, comprising:
a back plate; and
a lateral wall surrounding the back plate;
wherein the optical plate is carried by the back plate, and a top surface of the optical film is not shielded by the lateral wall.

14. A display device, comprising:
the backlight module of claim 1, and
a display panel disposed above the backlight module.

15. The display device of claim 14, wherein the microstructures are stacked from the end surface along a side direction away from the end surface and have substantially identical sizes located at different heights to allow the refractive part to have non-uniform thickness relative to the end surface along the side direction.

16. The display device of claim 14, wherein the microstructures are stacked from the end surface along a side direction away from the end surface and have different sizes to allow the refractive part to have non-uniform thickness relative to the end surface along the side direction.

17. A backlight module, comprising:
a frame, comprising:
a back plate; and
a lateral wall surrounding the back plate;
an optical plate, comprising:
a light-emitting surface;
a bottom surface opposite to the light-emitting surface; and
a side surface connected between the light-emitting surface and the bottom surface;
a light source facing to the bottom surface or the side surface of the optical plate; and
at least one optical film disposed above the light-emitting surface, the optical film comprising:
a main body, comprising:
a first surface;
a second surface opposite to the first surface; and
at least one end surface connected between the first surface and the second surface; and
at least one refractive part disposed on the end surface;
wherein an inner surface of the lateral wall comprises a first area and a second area, the first area is corresponding to the optical film, the second area is corresponding to the optical plate, and a surface roughness of the first area is greater than a surface roughness of the second area.

18. A display device, comprising:
the backlight module of claim 17, and
a display panel disposed above the backlight module.

19. A backlight module, comprising:
a frame, comprising:
a back plate; and
a lateral wall surrounding the back plate;
an optical plate, comprising:
a light-emitting surface;
a bottom surface opposite to the light-emitting surface; and
a side surface connected between the light-emitting surface and the bottom surface;
a light source facing to the bottom surface or the side surface of the optical plate; and
at least one optical film disposed above the light-emitting surface, the optical film comprising:
a main body, comprising:
a first surface;
a second surface opposite to the first surface; and
at least one end surface connected between the first surface and the second surface; and
at least one refractive part disposed on the end surface;

wherein an inner surface of the lateral wall comprises a first area and a second area, the first area is corresponding to the optical film, the second area is corresponding to the optical plate, and a reflectivity of the first area is smaller than a reflectivity of the second area.

20. A display device, comprising:

the backlight module of claim 19, and a display panel disposed above the backlight module.

\* \* \* \* \*